United States Patent
Ly et al.

(10) Patent No.: US 11,917,253 B2
(45) Date of Patent: Feb. 27, 2024

(54) SYSTEM AND METHOD FOR FACILITATING A VIRTUAL SCREENING

(71) Applicant: Screen Engine/ASI, LLC, Los Angeles, CA (US)

(72) Inventors: Andrew Ly, Poway, CA (US); Sean Kai Dan, San Diego, CA (US); Thomas M. Hendrick, San Diego, CA (US); Ian Bonewitz, San Diego, CA (US); William J. Rhein, San Diego, CA (US)

(73) Assignee: Screen Engine/ASI, LLC, Los Angeles, CA (US)

( * ) Notice: Subject to any disclaimer, the term of this patent is extended or adjusted under 35 U.S.C. 154(b) by 0 days.

(21) Appl. No.: 17/853,298

(22) Filed: Jun. 29, 2022

(65) Prior Publication Data
US 2023/0007350 A1    Jan. 5, 2023

Related U.S. Application Data

(60) Provisional application No. 63/216,933, filed on Jun. 30, 2021.

(51) Int. Cl.
*H04N 21/475* (2011.01)
*G06F 21/16* (2013.01)
*H04L 9/40* (2022.01)

(52) U.S. Cl.
CPC ......... *H04N 21/4756* (2013.01); *G06F 21/16* (2013.01); *H04L 63/18* (2013.01); *H04L 2463/082* (2013.01)

(58) Field of Classification Search
CPC ...... G06F 21/1063; G06F 21/16; G06F 21/31; G06F 21/606; G06F 2221/2107;
(Continued)

(56) References Cited

U.S. PATENT DOCUMENTS 7,212,988 B1    5/2007   Feldten
10,445,762 B1   10/2019  Ho
(Continued)

OTHER PUBLICATIONS

International Search Report dated Nov. 3, 2022 issued in connection with PCT Application No. PCT/US22/35535.
(Continued)

*Primary Examiner* — Olugbenga O Idowu
(74) *Attorney, Agent, or Firm* — Akerman LLP

(57) ABSTRACT

A system for facilitating a virtual screening is disclosed. The system identifies a user for participating in a virtual screening of media content. The system generates a unique link for the user to facilitate access to the media content. When the user interacts with the link, the system prompts the user to authenticate with the system and determines whether the authentication was successful. If authentication is successful, the link is associated with an identifier of the user and/or a user device. A request for a key for decrypting the media content and a request for a digitally signed file accessing the media content pursuant to parameters are made. If the digitally signed file is valid, the system applies a watermark to the media content to track the use of the media content and streams the media content to the user. Feedback on the media content is obtained from the user.

20 Claims, 5 Drawing Sheets

(58) Field of Classification Search
CPC ....... G06F 2221/2137; H04L 2463/082; H04L 2463/101; H04L 63/0861; H04L 63/18; H04N 21/2347; H04N 21/2358; H04N 21/25875; H04N 21/25891; H04N 21/43853; H04N 21/44236; H04N 21/4756; H04N 21/63345; H04N 21/8358; H04N 21/8586
See application file for complete search history.

(56) References Cited

U.S. PATENT DOCUMENTS

| | | |
|---|---|---|
| 2008/0140702 A1 | 6/2008 | Reed et al. |
| 2015/0143392 A1* | 5/2015 | Silveira-Filho .... H04N 21/8456 725/10 |
| 2015/0248542 A1* | 9/2015 | Mahadevan ............ G06F 21/10 726/27 |

OTHER PUBLICATIONS

Written Opinion of the International Searching Authority dated Nov. 3, 2022 issued in connection with PCT Application No. PCT/US22/35535.

* cited by examiner

SYSTEM AND METHOD FOR FACILITATING A VIRTUAL SCREENING

CROSS-REFERENCE TO RELATED APPLICATIONS

This application claims priority to U.S. Provisional Patent Application No. 63/216,933 filed on Jun. 30, 2021, the entirety of which is incorporated herein by reference.

FIELD OF THE INVENTION

The present application relates to virtual screening technologies, content distribution technologies, participant recruitment technologies, anti-piracy technologies, authentication technologies, artificial intelligence technologies, machine learning technologies, cloud-computing technologies, data analysis technologies, and, more particularly, to a system and method for facilitating a virtual screening of media content.

BACKGROUND

Film and television screenings typically involve the presentation of a film or television program to a limited audience as part of the film or television program's production and release cycle. Such film and television screenings serve a variety of purposes and are often conducted prior to distribution to the masses. For example, film producers may seek to conduct test screenings with a small target audience with certain demographic characteristics that are indicative of the general population at large in order to solicit feedback from the target audience prior to release of a film to the general population. Based on the feedback from the target audience, the film or television program may potentially be reshot, edited, or even rewritten to increase the probability of appealing to a target population and driving ticket sales and/or viewership numbers. Notably, the feedback may be solicited from the target audience through a variety of techniques and methodologies. For example, feedback may be solicited via in-person focus groups, written or digital surveys, phone interviews, video interviews, and other feedback solicitation methodologies.

Currently, the primary way to conduct advance film and television screenings is to do so by using multiple disparate services that are often conducted by different vendors. For instance, one company may set up a reservation system to set up reservations for individuals to attend a potential screening, or, in certain cases, may go via the simpler route by using traditional spreadsheets or digital documents to manually enter information associated with each individual obtaining a reservation to attend a screening. Once the list of individuals that are selected for screening is generated, a vendor may send emails or make phone calls to such individuals indicating where the screening will take place, timing information for the screening, and other relevant screening details. If the screening is at a physical theater location, a vendor associated with the screening location will set up the screening at the dates and times specified by the other vendor. If the screening is an online screening, a different vendor may be needed to set up the online video player and ensure that the content stream associated with streaming the screening is synchronized so that all screening participants view the screening simultaneously. Once the screening is completed, yet another vendor may be utilized to obtain feedback from screening participants, such as via in-person interviews, in-person or digital surveys, focus groups, and the like. Based on at least the foregoing, current screening reservation, viewing, and feedback processes are often inefficient, cumbersome, difficult to manage, and lack uniformity.

As a result, there remains room for substantial enhancements to existing technologies and processes and for the development of new technologies and processes to enhance the film and television screening experience for not only participants, but also for businesses interested in the reactions and feedback from such participants. While currently existing processes provide for various benefits, such processes still come with various drawbacks and inefficiencies. For example, currently existing processes and technologies often require the use of multiple different vendors that use different processes that utilize different data. Additionally, existing processes fail to provide for effective measures to effectively prevent or thwart piracy and/or unauthorized behavior conducted by screening participants and malicious actors. Furthermore, existing process are often labor-intensive and require a significant amount of administrative work to facilitate. Based on the foregoing, current reservation and screening processes may be improved and enhanced to provide for more effective screening capabilities, greater quality feedback gathering capabilities, enhanced reservation capabilities, enhanced anti-piracy capabilities, and improved screening participant satisfaction. Such enhancements and improvements to methodologies and technologies may lead to enhanced participation by screening participants, higher quality feedback from screening participants. enhanced participant engagement during screenings and surveys, and increased screening and reservation process efficiencies.

SUMMARY

A system and accompanying methods for facilitating a virtual screening are disclosed. In particular, the system and methods provide an end-to-end solution to process online invitations and recruitments from a database of users and/or external invitees to an advance media content screening that is hosted online in an efficient and streamlined manner. The system and methods further drive virtual screening participants to feedback gathering components of the same end-to-end solution. To that end, the system and methods may facilitate identification of users to participate in virtual screenings of media content, such by analyzing demographic information, user desire to participate in the virtual screenings, survey responses, other factors, or a combination thereof. The system and methods may generate a unique link for each user admitted to a screening and may make the link accessible to the user, such as via electronic mail, via an application, via text message, and/or via other means of communication. An admitted user may then authenticate with the system, such as via multifactor authentication, after interacting with the unique link. If a user is unable to successfully authenticate with the system, the user may be prevented from accessing the system and/or the system may generate a new link under certain circumstances. Once the admitted user successfully authenticates with the system, the system and methods may associate the unique link with an identifier of the user. For example, the unique link may be associated with an internet protocol address of the user, any device identifier of a device of the user, any type of identifier associated with the user or a device of the user, or a combination thereof.

The system and methods may include requesting a digital key for facilitating decryption of an encrypted version of the media content. For example, the media content may be encrypted using one or more digital rights management techniques and the digital key may be utilized to decrypt the encrypted media content so that it may be accessed by a user admitted to the virtual screening. The system and methods may also include requesting a digitally signed file, such as a digitally signed cookie, to facilitate access to the media content for a device of the user admitted to the virtual screening. In certain embodiments, the digitally signed file may incorporate and/or include one or more parameters that dictate how, when, and/or with what device the user may access the media content. Before the media content is streamed to the user, the system and methods may include applying a unique visual or other watermark to the media content so that use of the media content by the user may be tracked. For example, the watermark may be specific to the user and/or the user's device and may be utilized by the systems and methods to determine whether the media content was improperly transmitted to unauthorized users, systems, and/or devices, whether the media content was accessed in an unauthorized manner, whether the user copied the content, whether the user uploaded the content to an improper location, and/or whether the user altered the media content. Once the watermark is applied to the media content, the system and methods may include streaming the media content to a device of the user as part of the virtual screening of the media content. In certain embodiments, the version of the media content that is streamed to the user may be unique to that particular user. As the user is experiencing the media content and/or after the media content viewing experience has been completed, the system and methods may include providing digital surveys and/or other feedback mechanisms to obtain feedback from the user that is associated with the media content. The systems and methods may utilize the feedback to potentially alter the media content before being released to the masses. Based on the foregoing, the system and methods provide a seamless, efficient, and integrated system for identifying users for screenings, generating unique links and versions of media content for each user selected for a screening, the ability to control access to the content based on parameters and/or rules, monitoring usage of the media content, and obtaining feedback for potentially enhancing the media content.

In one embodiment, a system for facilitating a virtual screening is provided. The system may include a memory that stores instructions and a processor that executes the instructions to perform various operations of the system. The system may perform an operation that includes identifying a user for participating in a virtual screening of media content. For example, the user may be identified by the system based on demographic information, responses to questionnaires, psychographic information, the user having preferences associated with the media content, other factors, or a combination thereof. Once the user is identified, the system may perform an operation that includes generating and transmitting a unique link to the user for facilitating access to the media content for the virtual screening at a specified time. The user may interact with the unique link, and, based on the interaction, the system may perform an operation that includes authenticating the user for the virtual screening via a multifactor authentication process. For example, the system may authenticate the user via short message service (SMS) codes, time-based codes from authenticator applications, biometric information, any other authentication techniques, or a combination thereof. Once the user is authenticated with the system, the system may perform an operation that includes associating the unique link with an identifier associated with the user. For example, the unique link may be associated with and/or locked with the internet protocol address of a device of the user to ensure that the link may only be used by the user. The system may proceed to perform an operation that includes requesting a digital key, such as a digital rights management key, to facilitate decryption of the media content. Additionally, the system may perform an operation that includes requesting a digitally signed file, such as a cookie, for facilitating access to the media content by the device of the user at the specified time and/or for a specified duration of time. The system may perform an operation that includes applying a visual or other watermark to the media content that facilitates tracking of use of the media content by the user. Furthermore, the system may perform an operation that includes streaming, during the virtual screening, the media content to the device of the user according to one or more parameters specified by the digitally signed file and by utilizing the digital key. Moreover, the system may perform an operation that includes obtaining feedback associated with the media content from the user.

In another embodiment, a method for facilitating a virtual screening is disclosed. The method may include a memory that stores instructions and a processor that executes the instructions to perform the functionality of the method. In particular, the method may include identifying a user for participating in a virtual screening of media content. The method may also include transmitting a unique link to the user for facilitating access to the media content at a specified time. After the user interacts with the unique link, the method may include authenticating the user for the virtual screening via a multifactor authentication process. The method may proceed to include associating the unique link with an identifier associated with the user and/or a device of a user. The method may include requesting a digital key for facilitating decryption of the media content and requesting a digitally signed file for facilitating access to the media content for a device of the user at the specified time and/or for a specified duration of time. The method may include applying a visual or other watermark to the media content for facilitating tracking of use of the media content by the user and/or the device of the user. Furthermore, the method may include streaming, during a virtual screening, the media content to the device of the user according to one or more parameters of the digitally signed file and by utilizing the digital key. Moreover, the method may include obtaining feedback associated with the media content from the user.

According to yet another embodiment, a computer-readable device comprising instructions, which, when loaded and executed by a processor cause the processor to perform operations, the operations comprising: identifying a user for participating in a virtual screening of media content; transmitting a unique link to the user for facilitating access to the media content at a specified time; authenticating, after the user interacts with the unique link, the user for the virtual screening via a multifactor authentication process; associating, after the authenticating, the unique link with an identifier associated with the user; requesting a digital key for facilitating decryption of the media content; requesting a digitally signed file for facilitating access to the media content for a device of the user at the specified time and for a specified duration of time; applying a visual watermark to the media content for facilitating tracking of use of the media content; streaming, during the virtual screening, the media content to the device of the user according to a parameter of the digitally signed file and by utilizing the digital key; and obtaining feedback associated with the media content from the user.

These and other features of the systems and methods for facilitating a virtual screening are described in the following detailed description, drawings, and appended claims.

DETAILED DESCRIPTION OF THE DRAWINGS

Figure 1:
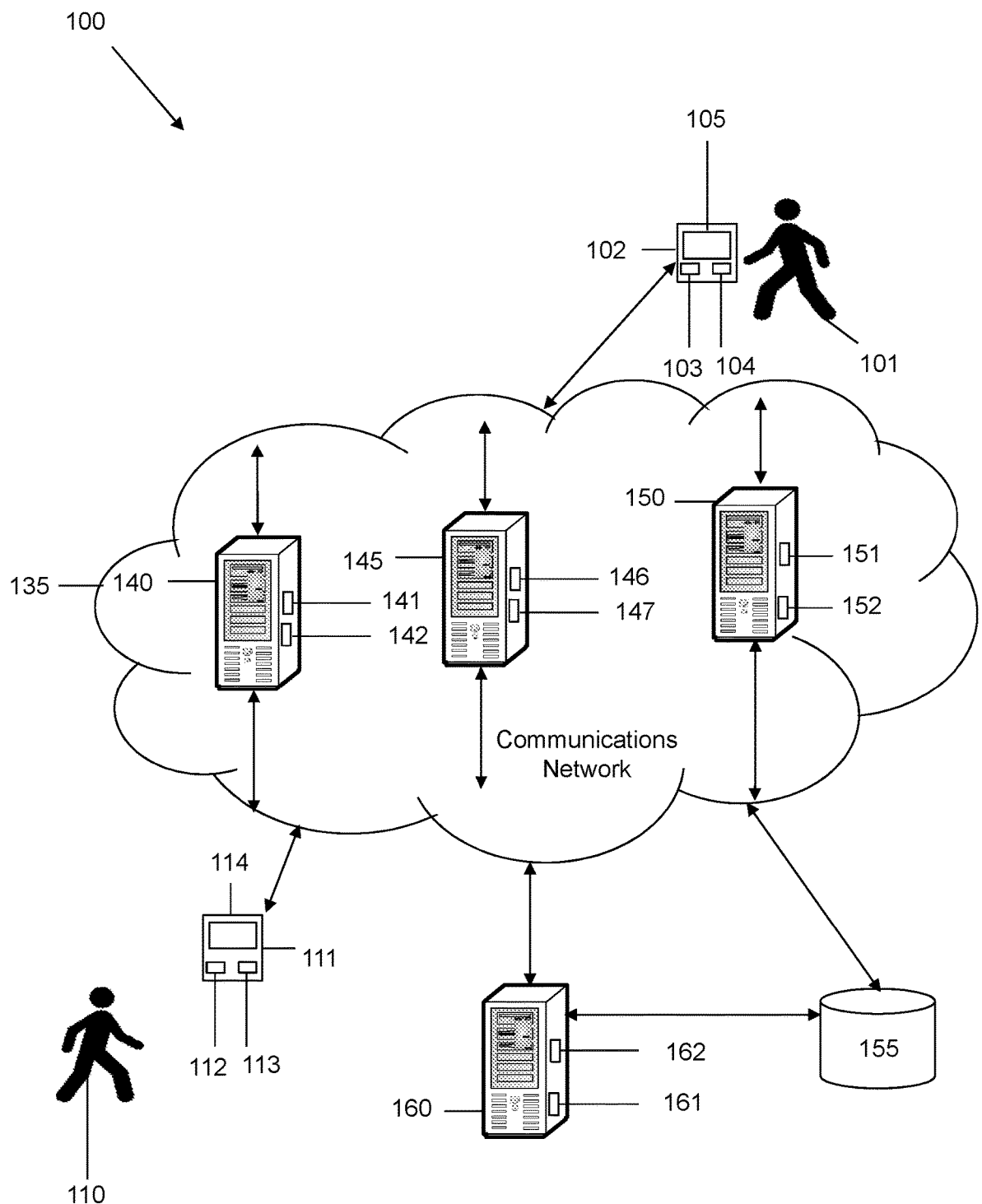
FIG. 1 is a schematic diagram of a system for facilitating a virtual screening according to an embodiment of the present disclosure.
Figure 2:
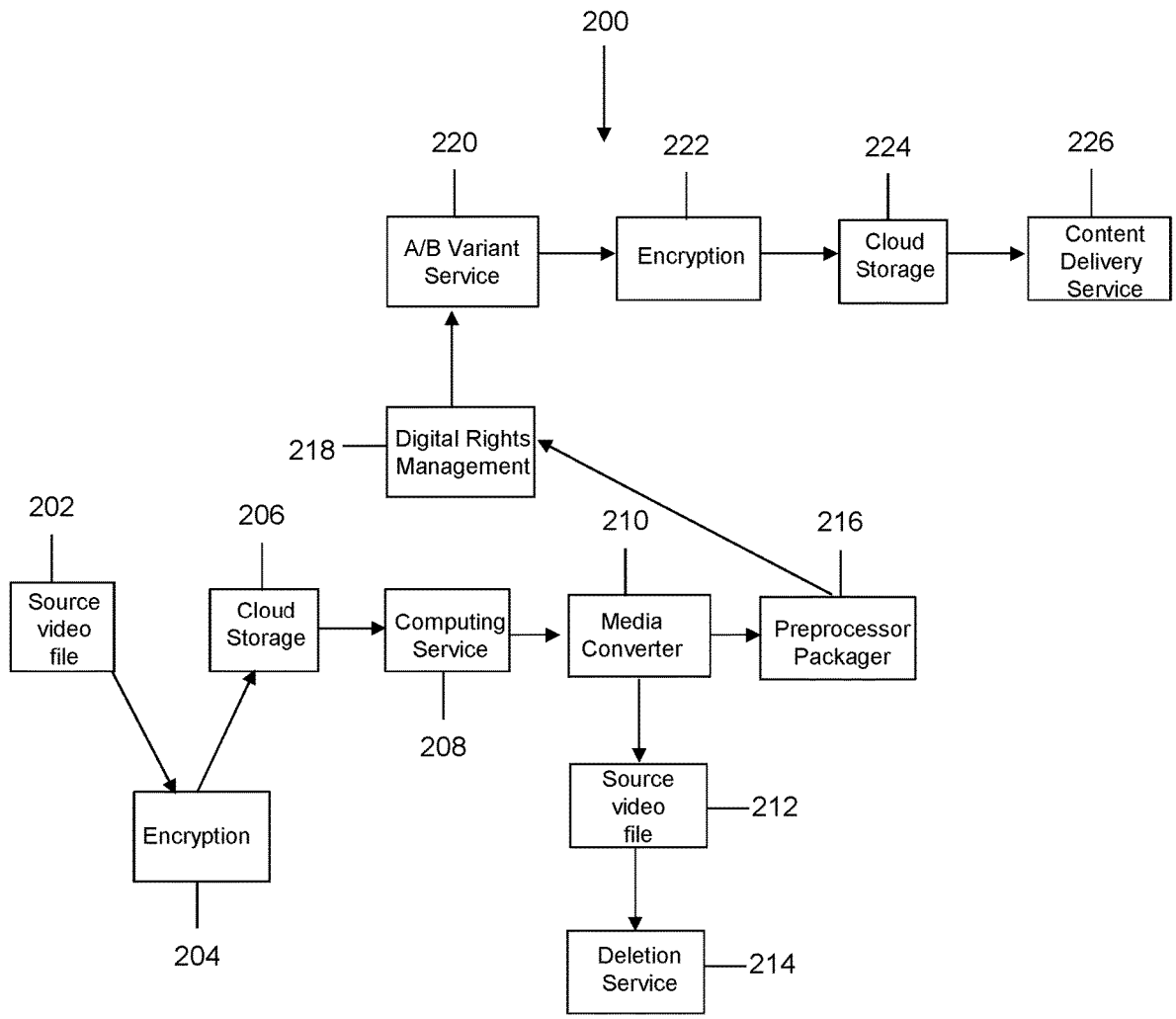
FIG. 2 is a schematic diagram illustrating components, functionality, and processors for facilitating a virtual screening.
Figure 3:
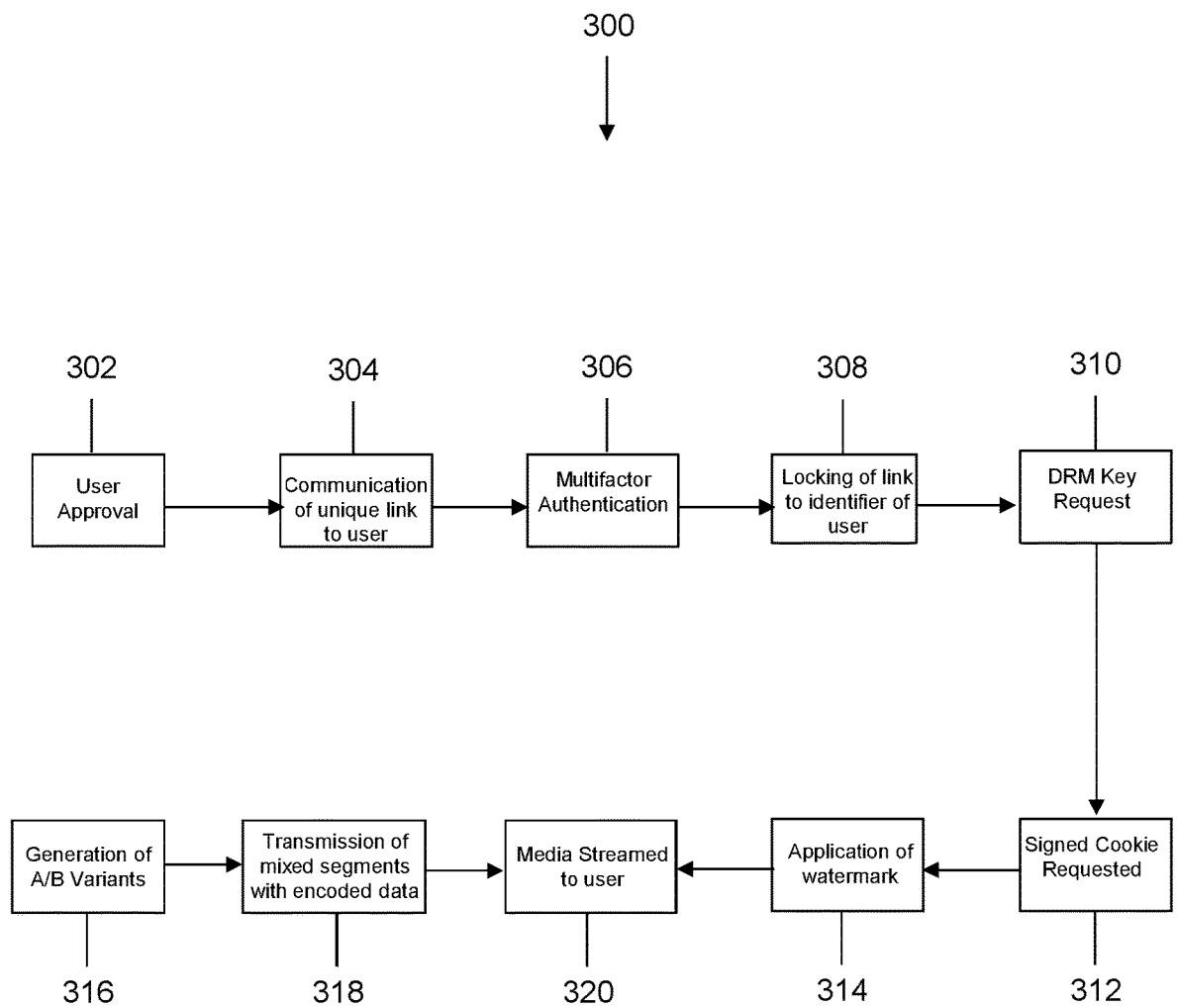
FIG. 3 is a schematic diagram illustrating additional processes and functionality for facilitating a virtual screening.

A system 100 and accompanying methods for facilitating a virtual screening are disclosed. Notably, the system 100 and methods provide an end-to-end solution to process online invitations and recruitments from a database of users and/or external invitees for the purpose of conducting advance media content screenings that are hosted online in an efficient and streamlined manner—all within the same system 100. The system 100 and methods also drive virtual screening participants to functionality of the system 100 that is configured to obtain feedback from the participants relating to the media content screenings. In particular, the system 100 and methods identify participants for participating in virtual screenings of media content, such by analyzing demographic information, a participant's desire to participate in the virtual screenings, survey responses, other factors, or a combination thereof. The system 100 and methods generate a unique link for each user selected for participation for a screening and may provide the link to the user via electronic mail, via an application, via text message, and/or via other means of communication. The participant may then authenticate with the system 100, such as via multifactor authentication, after interacting with the unique link. If the participant is unable to successfully authenticate with the system 100, the participant may be prevented from accessing the system 100 and/or the system 100 may generate a new link depending on the circumstances. If the participant successfully authenticates with the system 100, the system 100 and methods may associate the unique link with an identifier of the participant, such as the internet protocol address associated with a device of the participant.

The system 100 and methods may generate any number of versions of the media content to be screened by participants. For example, encoders may be utilized by the system 100 and methods to generate different resolutions of the media content, versions of the media content that include different types of content or portions of media content, versions of the media content that have different formats, altered versions of the content, and/or a combination thereof. In certain embodiments, each version of the media content may be injected with digital rights management features and may be encrypted for security purposes. Prior to providing a version of the media content to a participant during a virtual screening, the system 100 and methods may include requesting a digital key for facilitating decryption of the encrypted version of the media content. For example, the digital key may be utilized to decrypt the encrypted media content so that it may be accessed by the participant admitted to the virtual screening. The system 100 and methods may also include requesting a digitally signed file, such as a digitally signed cookie, to facilitate access to the media content for a device of the participant admitted to the virtual screening. In certain embodiments, the digitally signed file may incorporate and/or include one or more parameters that dictate how, when, and/or with what device the participant may access the media content. Before the media content is streamed to the participant, the system 100 and methods may include applying a unique visual or other watermark to the media content intended for the participant so that use of the media content by the participant may be tracked by the system 100. For example, the watermark may be specific to the participant and/or the participant's device and may be utilized by the system 100 and methods to determine whether the media content was improperly used, accessed, copied, transmitted, and/or manipulated. Once the watermark is applied to the media content, the system 100 and methods may include streaming the media content to a device of the participant as part of the virtual screening of the media content. As the participant is experiencing the media content and/or after the media content viewing experience has been completed by the participant, the system 100 and methods may include providing digital surveys and/or other feedback mechanisms to obtain feedback from the participant that perceived the media content. The system 100 and methods may then utilize the feedback to potentially alter the media content before being released to the masses.

As shown in FIG. 1 and referring also to FIGS. 2-5, a system 100 and method 400 for facilitating a virtual screening are disclosed. Notably, the system 100 may be configured to support, but is not limited to supporting, virtual screening systems and services, encryption systems and services, data analytics systems and services, feedback gathering systems and services, data collation and processing systems and services, artificial intelligence services and systems, machine learning services and systems, content delivery services, cloud computing services, satellite services, telephone services, voice-over-internet protocol services (VoIP), software as a service (SaaS) applications, platform as a service (PaaS) applications, gaming applications and services, social media applications and services, operations management applications and services, productivity applications and services, mobile applications and services, and/or any other computing applications and services. Notably, the system 100 may include a first user 101, who may utilize a first user device 102 to access data, content, and services, or to perform a variety of other tasks and functions. As an example, the first user 101 may utilize first user device 102 to transmit signals to access various online services and content, such as those available on an internet, on other devices, and/or on various computing systems. As another example, the first user device 102 may be utilized to access an application, devices, and/or components of the system 100 that provide any or all of the operative functions of the system 100. In certain embodiments, the first user 101 may be a person, a robot, a humanoid, a program, a computer, any type of user, or a combination thereof, that may be located in a particular location. In certain embodiments, the first user 101 may be a person that may want to participate in virtual screenings of media content, such as, but not limited to, video content, audio content, film content, television content, augmented reality content, virtual reality content, any type of content, or a combination thereof. The first user device 102 may include a memory 103 that includes instructions, and a processor 104 that executes the instructions from the memory 103 to perform the various operations that are performed by the first user device 102. In certain embodiments, the processor 104 may be hardware, software, or a combination thereof. The first user device 102 may also include an interface 105 (e.g. screen, monitor, graphical user interface, etc.) that may enable the first user 101 to interact with various applications executing on the first user device 102 and to interact with the system 100. In certain embodiments, the first user device 102 may be and/or may include a computer, any type of sensor, a laptop, a set-top-box, a tablet device, a phablet, a server, a mobile device, a smartphone, a smart watch, and/or any other type of computing device. Illustratively, the first user device 102 is shown as a smartphone device in FIG. 1. In certain embodiments, the first user device 102 may be utilized by the first user 101 to control and/or provide some or all of the operative functionality of the system 100.

In addition to using first user device 102, the first user 101 may also utilize and/or have access to additional user devices. As with first user device 102, the first user 101 may utilize the additional user devices to transmit signals to access various online services and content. The additional user devices may include memories that include instructions, and processors that executes the instructions from the memories to perform the various operations that are performed by the additional user devices. In certain embodiments, the processors of the additional user devices may be hardware, software, or a combination thereof. The additional user devices may also include interfaces that may enable the first user 101 to interact with various applications executing on the additional user devices and to interact with the system 100. In certain embodiments, the first user device 102 and/or the additional user devices may be and/or may include a computer, any type of sensor, a laptop, a set-top-box, a tablet device, a phablet, a server, a mobile device, a smartphone, a smart watch, and/or any other type of computing device, and/or any combination thereof. Sensors may include, but are not limited to, cameras, eye-tracking sensors (e.g. to track a person's eye movements while experiencing media content), face-tracking sensors (e.g. to track a user's expressions while experiencing media content), mouth-tracking sensors, motion sensors, acoustic/audio sensors, pressure sensors, temperature sensors, light sensors, heart-rate sensors, blood pressure sensors, sweat detection sensors, any type of health sensor, humidity sensors, any type of sensors, or a combination thereof.

The first user device 102 and/or additional user devices may belong to and/or form a communications network. In certain embodiments, the communications network may be a local, mesh, or other network that enables and/or facilitates various aspects of the functionality of the system 100. In certain embodiments, the communications network may be formed between the first user device 102 and additional user devices through the use of any type of wireless or other protocol and/or technology. For example, user devices may communicate with one another in the communications network by utilizing any protocol and/or wireless technology, satellite, fiber, or any combination thereof. Notably, the communications network may be configured to communicatively link with and/or communicate with any other network of the system 100 and/or outside the system 100.

In certain embodiments, the first user device 102 and additional user devices belonging to the communications network may share and exchange data with each other via the communications network. For example, the user devices may share information relating to the various components of the user devices, information associated with images and/or content accessed by a user of the user devices, information identifying the locations of the user devices, information indicating the types of sensors that are contained in and/or on the user devices, information identifying the applications being utilized on the user devices, information identifying how the user devices are being utilized by a user, information identifying user profiles for users of the user devices, information identifying device profiles for the user devices, information identifying the number of devices in the communications network, information identifying devices being added to or removed from the communications network, any other information, or any combination thereof.

In addition to the first user 101, the system 100 may also include a second user 110. Much like the first user 101, the second user 110 may be a person that may want to participate in virtual screenings of media content, such as, but not limited to, video content, audio content, film content, television content, augmented reality content, virtual reality content, any type of content, or a combination thereof. In certain embodiments, the second user device 111 may be utilized by the second user 110 to transmit signals to request various types of content, services, and data provided by and/or accessible by communications network 135 or any other network in the system 100. In further embodiments, the second user 110 may be a robot, a computer, a humanoid, an animal, any type of user, or any combination thereof. The second user device 111 may include a memory 112 that includes instructions, and a processor 113 that executes the instructions from the memory 112 to perform the various operations that are performed by the second user device 111. In certain embodiments, the processor 113 may be hardware, software, or a combination thereof. The second user device 111 may also include an interface 114 (e.g. screen, monitor, graphical user interface, etc.) that may enable the first user 101 to interact with various applications executing on the second user device 111 and, in certain embodiments, to interact with the system 100. In certain embodiments, the second user device 111 may be a computer, a laptop, a set-top-box, a tablet device, a phablet, a server, a mobile device, a smartphone, a smart watch, and/or any other type of computing device. Illustratively, the second user device 111 is shown as a mobile device in FIG. 1. In certain embodiments, the second user device 111 may also include sensors, such as, but are not limited to, cameras, audio sensors, face-tracking sensors, eye-tracking sensors, mouth-tracking sensors, motion sensors, pressure sensors, temperature sensors, light sensors, heart-rate sensors, blood pressure sensors, sweat detection sensors, stress-detection sensors, any type of health sensor, humidity sensors, any type of sensors, or a combination thereof.

In certain embodiments, the first user device 102, the additional user devices, and/or the second user device 111 may have any number of software applications and/or application services stored and/or accessible thereon. For example, the first user device 102, the additional user devices, and/or the second user device 111 may include applications for controlling and/or accessing the operative features and functionality of the system 100, applications for controlling and/or accessing any device of the system 100, media distribution and/or presentation applications, interactive social media applications, biometric applications, cloud-based applications, feedback applications, Von' applications, other types of phone-based applications, product-ordering applications, business applications, e-commerce applications, media streaming applications, content-based applications, media-editing applications, database applications, gaming applications, internet-based applications, browser applications, mobile applications, service-based applications, productivity applications, video applications, music applications, social media applications, any other type of applications, any types of application services, or a combination thereof. In certain embodiments, the software applications may support the functionality provided by the system 100 and methods described in the present disclosure. In certain embodiments, the software applications and services may include one or more graphical user interfaces to enable the first and/or potentially second users 101, 110 to readily interact with the software applications. The software applications and services may also be utilized by the first and/or second users 101, 110 to interact with any device in the system 100, any network in the system 100, or any combination thereof. In certain embodiments, the first user device 102, the additional user devices, and/or the second user device 111 may include associated telephone numbers, device identities, or any other identifiers to uniquely identify the first user device 102, the additional user devices, and/or the second user device 111.

The system 100 may also include a communications network 135. The communications network 135 may be under the control of a service provider, a company that conducts virtual screenings, the first user 101, any other designated user, a computer, another network, or a combination thereof. The communications network 135 of the system 100 may be configured to link each of the devices in the system 100 to one another. For example, the communications network 135 may be utilized by the first user device 102 to connect with other devices within or outside communications network 135. Additionally, the communications network 135 may be configured to transmit, generate, and receive any information and data traversing the system 100. In certain embodiments, the communications network 135 may include any number of servers, databases, or other componentry. The communications network 135 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 140, 145, and 150 are shown as being included within communications network 135. In certain embodiments, the communications network 135 may be part of a single autonomous system that is located in a particular geographic region, or be part of multiple autonomous systems that span several geographic regions.

Notably, the functionality of the system 100 may be supported and executed by using any combination of the servers 140, 145, 150, and 160. The servers 140, 145, and 150 may reside in communications network 135, however, in certain embodiments, the servers 140, 145, 150 may reside outside communications network 135. The servers 140, 145, and 150 may provide and serve as a server service that performs the various operations and functions provided by the system 100. In certain embodiments, the server 140 may include a memory 141 that includes instructions, and a processor 142 that executes the instructions from the memory 141 to perform various operations that are performed by the server 140. The processor 142 may be hardware, software, or a combination thereof. Similarly, the server 145 may include a memory 146 that includes instructions, and a processor 147 that executes the instructions from the memory 146 to perform the various operations that are performed by the server 145. Furthermore, the server 150 may include a memory 151 that includes instructions, and a processor 152 that executes the instructions from the memory 151 to perform the various operations that are performed by the server 150. In certain embodiments, the servers 140, 145, 150, and 160 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 140, 145, 150 may be communicatively linked to the communications network 135, any network, any device in the system 100, or any combination thereof.

The database 155 of the system 100 may be utilized to store and relay information that traverses the system 100, cache content that traverses the system 100, store data about each of the devices in the system 100 and perform any other typical functions of a database. In certain embodiments, the database 155 may be connected to or reside within the communications network 135, any other network, or a combination thereof. In certain embodiments, the database 155 may serve as a central repository for any information associated with any of the devices and information associated with the system 100. Furthermore, the database 155 may include a processor and memory or may be connected to a processor and memory to perform the various operation associated with the database 155. In certain embodiments, the database 155 may be connected to the servers 140, 145, 150, 160, the first user device 102, the second user device 111, the additional user devices, any devices in the system 100, any process of the system 100, any program of the system 100, any other device, any network, or any combination thereof.

The database 155 may also store information and metadata obtained from the system 100, store metadata and other information associated with the first and second users 101, 110, store sensor data and/or content obtained from an environment that the first and/or second users 101, 110 are located in, store information relating to a user's experience with media content distributed and/or presented by the system 100, store information relating to digital rights management, store digital keys for encrypting and/or decrypting media content, store files (e.g. cookies, etc.) for facilitating access to media content, store parameters and/or rules specified by the files, store feedback obtained from the first and/or second users 101, 110 relating to the media content, store media content, store different resolutions and/or versions of the media content, store identifiers associated with user devices (e.g. device identifiers, internet protocol addresses, MAC addresses, username and/or password combinations, etc.) and/or users, store links generated by the system 100 for accessing media content, store information associated with behaviors and/or actions conducted by individuals, multi-factor authentication codes, lists of users authorized to access media content and/or types of media content, lists of devices authorized to access media content and/or types of media content, store different formats of the media content, store modified versions of the media content, store user profiles associated with the first and second users 101, 110, store device profiles associated with any device in the system 100, store communications traversing the system 100, store user preferences, store information associated with any device or signal in the system 100, store information relating to patterns of usage relating to the user devices 102, 111, store any information obtained from any of the networks in the system 100, store historical data associated with the first and second users 101, 110, store device characteristics, store information relating to any devices associated with the first and second users 101, 110, store information associated with the communications network 135, store any information generated and/or processed by the system 100, store any of the information disclosed for any of the operations and functions disclosed for the system 100 herewith, store any information traversing the system 100, or any combination thereof. Furthermore, the database 155 may be configured to process queries sent to it by any device in the system 100.

The system 100 may also include any number of subsystems including, but not limited to, subsystem 200, subsystem 300, any other subsystem, or a combination thereof, which may be utilized to support the functionality of the system 100 and/or method 400. In certain embodiments, the subsystems 200-300 may be separate from the system 100, within the system 100, and/or be partially within the system 100. The subsystem 200 may be a subsystem that may be utilized by the system 100 to process, store, format, encrypt, modify, and/or deliver media content to users, such as user participating a virtual screening of media content. The subsystem 300 may be a subsystem that may be utilized by the system 100 to approve users for participating in virtual screenings and stream media content associated with such virtual screenings to such users. At 202, the subsystem 200 may include obtaining a source video file (or other media file) to be streamed to a user during a virtual screening. For example, the source video file may be a movie file, a television program, a commercial, any type of media content, or a combination thereof. The source video file may be obtained from those in control of the media content, those that created the media content, a media content origin server, and/or media content repositories. At 204, the source video file may be encrypted by utilizing any suitable encryption technique, such as, but not limited to, AES-256 encryption. Once the video source file (or other media content) is encrypted, the encrypted media content may be stored, at 206, via an object storage service that facilitates handling, delivery, and/or availability of the video source file 202. In certain embodiments, the object storage service may be a cloud storage service. At 208, the subsystem 200 may include utilizing a computing service, which may be utilized to provide computing resources for managing the media content and/or executing code associated with managing the media content. In certain embodiments, the computing service may be a serverless computing service that operates without provisioning and/or managing servers. In certain embodiments, the computing service may be utilized to process the media content for distribution and/or other purposes as desired.

At 210, the subsystem 200 may utilize a media converter to transcode the encrypted source video file into any number of output formats to facilitate streaming and/or consumption of the media content on any number of devices, any types of devices, any types of software applications, any types of mobile applications, any types of devices having different capabilities, or a combination thereof. The transcoding may also be utilized to create numerous versions of the media content that have different resolutions, qualities, frame rates, audio qualities, play lengths, and/or other characteristics. For example, the media converter may be utilized to convert the source video file into formats including, but not limited to, HLS Dash ISO, CMAF, MPEG-4, QuickTime, MPEG-3, any other format, or a combination thereof. At 212, the subsystem 200 may cause the source video file to be transmitted after transcoding is conducted by the media converter. At 214, in certain embodiments, the source video file may be provided to a deletion service to delete the source video file after the various output formats of the media content are generated. In certain embodiments, the source video file may be kept instead of being provided to a deletion service. At 216, the subsystem 200 may utilize a preprocessor packager to process the various versions of the media content. Once the preprocessing is the completed, the preprocessor packager may provide the various versions of media content to a digital rights management system at 218. The digital rights management system may inject digital rights management code and/or features into the various versions of the media content to ensure that the media content is not tampered with and/or utilized in a manner that is unauthorized. Once the digital rights management features are injected into the various versions of the media content, the versions of the media content may be provided to a A/B variant service at 220. The A/B variant service may be utilized to generate further versions of the media content so as to determine whether certain versions of the media content are preferred by virtual screening participants over other versions. For example, the A/B variant service may generate a version of the media content that includes a particular scene and another version that has a different version of the scene or removes the scene altogether.

At 222, the subsystem 200 may encrypt the various versions of the media content to secure the media content and to ensure that unauthorized access to the versions of the media content does not occur. At 224, the versions of the media content may be provided to a cloud storage service for storing the various versions of media content and/or to prepare the versions of media content for transmission to a content delivery service. At 226, the subsystem 200 may include providing the various versions of the media content to a content delivery service, which may be utilized to distribute the content to all the devices of users participating in virtual screenings. The content delivery service may transmit the appropriate version of the media content to the appropriate device of a particular user. For example, if a first user is to get a 4*k* version of the media content that includes an extra scene, the content delivery service may ensure that the particular version of the media content is streamed and/or delivered to the device of the first user. As another example, if a second user is to get a 1080p version of the media content that does not include a particular scene, the content delivery service will ensure distribution of the correct version of the media content to the second user. In certain embodiments, the subsystem 200 may stream all the different versions of the media content at a specified time, at random times, at staggered times, or at any other desired interval.

With regard to subsystem 300, subsystem 300 may be utilized to approve users for virtual screenings and distribute the appropriate version of media content to each user, while also ensuring that the media content is only accessed and utilized in a manner as authorized by the system 100. At 302, the subsystem 300 may identify and/or approve users for inclusion in a virtual screening of media content. The subsystem 300 may generate unique links for each user to facilitate access by the user to the media content at 304. At 306, when a user interacts with his own unique link (e.g. such as by clicking or otherwise selecting the link), the subsystem 300 may initiate a multifactor authentication process. For example, the subsystem 300 may transmit a unique code to a device of the user, which the user must then enter into an application supporting the functionality of the system 100 in order to authenticate with the system 100. Notably, any number of layers of authentication may be required for users. For example, the subsystem 300 and/or system 100 may require the input of time-based one-time passwords generated directly by the application supporting the functionality of the system 100 or by a separate application, such as an authenticator application, that generates unique codes at selected or random time intervals. In certain embodiments, other layers of authentication may be utilized as well. For example, biometric authentication, such as, but not limited to, iris scans, fingerprint scans, heart rate scans, temperature measurements, user health profiles, body measurement information, and/or other biometric information may be utilized to authenticate the user into the system 100 in combination with other forms of authentication. Once the user successfully authenticates with the system 100, the subsystem 300 may lock the unique link to an identifier associated with the user, at 308. For example, an internet protocol address (or any other identifier associated with the user) may be locked to the specific link for accessing the media content so that only a device having the internet protocol address locked to the link may be able to access the media content associated with the link.

At 310, a request for a digital rights management key (or other key for decrypting media content) may be sent so that the user's device (or other component of system 100) may decrypt an encrypted version of the media content to be streamed to the user. At 312, a digitally signed file (e.g. a cookie or other file) may also be requested by the system 100 to ensure that a valid signature from an authorized user for screening the media content is present prior to delivering the media content to the user. The receipt of a valid digitally signed file, which may include the name-value pairs provided by the system prior to transmission of the digitally signed file, may be utilized to confirm that the correct user is attempting to access a particular version of the media content. If an invalid signature is present or an invalid file is provided, the system 100 and/or subsystem 300 may prevent a user from accessing the media content. The digitally signed file may also dictate the conditions by which the user may access the media content (e.g. time, place, duration, whether copies may be made, whether the media content may be streamed to others, etc.). If the digitally signed file is provided with a valid signature, the subsystem 300 may apply one or more watermarks to the media content intended for streaming to the user, at 314. The watermark may be utilized by the system 100 and/or subsystem to track usage of the media content by the user, such as whether the media content was transmitted to others by the user, whether the media content was duplicated, whether the media content was modified, and/or if anything unauthorized was performed with respect to the media content.

Once the watermark is applied to the media content, the subsystem 300, at 320, may include streaming the media content intended for that particular user to the user's device during a virtual screening. In certain embodiments, before the media content is streamed to the user, the subsystem 300 may generate A/B variants of the media content at 316. At 318, the subsystem 300 may mix segments of the media content with encoded data and then stream the media content including the mixed segments and encoded data to the user for viewing at 320. The user may then provide feedback relating to the viewing of the media content, which may then be utilized by the system 100 to potentially modify the content. In certain embodiments, different versions of the media content (e.g. A/B variants) may be presented and streamed to the user at different times, side-by-side, and/or in different manners. In certain embodiments, the functionality provided by subsystem 200 may be combined with the functionality of sub system 300 and/or system 100.

Notably, as shown in FIG. 1, the system 100 may perform any of the operative functions disclosed herein by utilizing the processing capabilities of server 160, the storage capacity of the database 155, or any other component of the system 100 to perform the operative functions disclosed herein. The server 160 may include one or more processors 162 that may be configured to process any of the various functions of the system 100. The processors 162 may be software, hardware, or a combination of hardware and software. Additionally, the server 160 may also include a memory 161, which stores instructions that the processors 162 may execute to perform various operations of the system 100. For example, the server 160 may assist in processing loads handled by the various devices in the system 100, such as, but not limited to, identifying users for participating in virtual screenings of media content distributed and/or presented by the system 100; generating and/or transmitting unique links to a user to facilitate access to media content; facilitating authentication into the system 100 and/or to access the media content; preventing users from accessing the content; associating a link to be transmitted to a particular user with an identifier associated with the user; processing requests for digital keys for encrypting and/or decrypting media content; processing requests for digitally signed files for facilitating and/or dictating access to media content; applying visual or other watermarks to the media content for tracking use of the media content by a user and/or device of the user; streaming the media content during a virtual screening; obtaining feedback associated with the media content from a user that participated in a virtual screening of the media content; and performing any other suitable operations conducted in the system 100 or otherwise. In one embodiment, multiple servers 160 may be utilized to process the functions of the system 100. The server 160 and other devices in the system 100, may utilize the database 155 for storing data about the devices in the system 100 or any other information that is associated with the system 100. In one embodiment, multiple databases 155 may be utilized to store data in the system 100.

Although FIGS. 1-5 illustrates specific example configurations of the various components of the system 100, the system 100 may include any configuration of the components, which may include using a greater or lesser number of the components. For example, the system 100 is illustratively shown as including a first user device 102, a second user device 111, a communications network 135, a server 140, a server 145, a server 150, a server 160, and a database 155. However, the system 100 may include multiple first user devices 102, multiple second user devices 111, multiple communications networks 135, multiple servers 140, multiple servers 145, multiple servers 150, multiple servers 160, multiple databases 155, and/or any number of any of the other components inside or outside the system 100. Furthermore, in certain embodiments, substantial portions of the functionality and operations of the system 100 may be performed by other networks and systems that may be connected to system 100.

Figure 4:
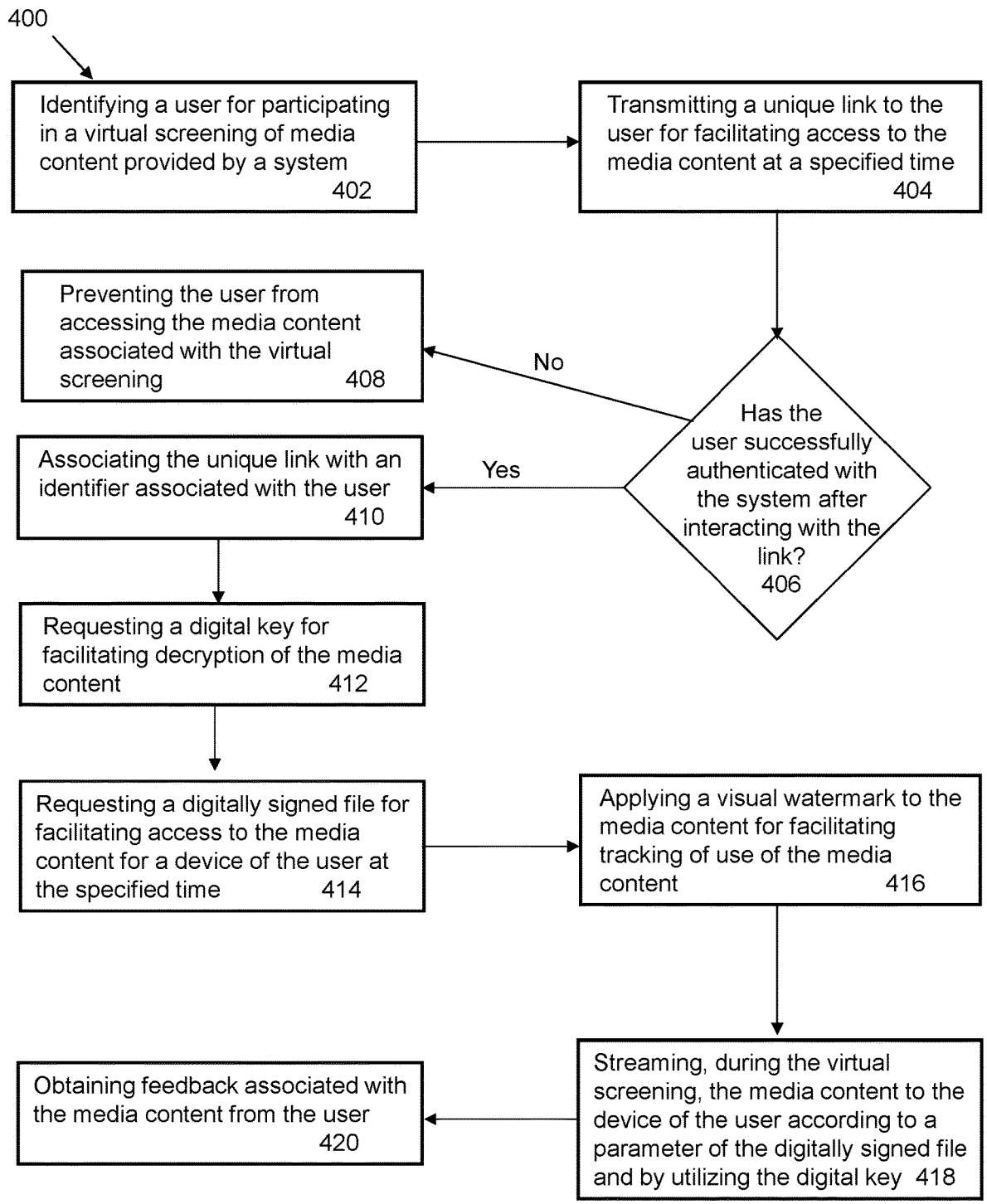
FIG. 4 is a flow diagram illustrating a sample method for facilitating a virtual screening according to an embodiment of the present disclosure.

Notably, the system 100 may execute and/or conduct the functionality as described in the method(s) that follow. As shown in FIG. 4, an exemplary method 400 for facilitating a virtual screening of media content is schematically illustrated. The method 400 and/or functionality and features supporting the method 400 may be conducted via an application of the system 100, devices of the system 100, processes of the system 100, any component of the system 100, or a combination thereof. The method 400 may include steps for identifying users for participating in virtual screenings, generating unique links for users to obtain access to media content associated with a virtual screening, authenticating the users into the system 100 facilitating the virtual screening, associating the unique link to the particular user and/or the user's device, using digitally signed files to control access to the media content, applying watermarks to track usage of the content, streaming the media content to the user participating in the virtual screening, and obtaining feedback and reactions from the user through a variety of feedback solicitation techniques and/or processes. The processes facilitated by the method 400 allow for an integrated and seamless virtual screening reservations, media content distribution, and feedback gathering and analysis all by utilizing the same system 100. Those conducting the screenings of the media content may utilize the feedback from screening participants to enhance the media content, alter the media content, and/or create a new version of the media content prior to distribution of the media content to the masses. Additionally, over time, the feedback collected via the method 400 may be utilized to train the system 100 over time to detect which users would prefer which types of media content, the types of reactions that a specific type of user (e.g. demographic or other characteristics) may have to certain types of media content, and/or to potentially generate different versions of the media content on the fly based on feedback, inputs, and/or by request.

The steps of method 400 may be performed in any desired sequence, however, in a preferred embodiment, the method 400 may proceed as follows: At step 402, the method 400 may include identifying a user for participating in a virtual screening of media content provided by the system 100. For example, a movie studio may host media content (e.g. a portion of a movie and/or an entire movie) in the system 100 for distribution to users who have been selected for virtual screenings of the media content. The movie studio may have a digital questionnaire or survey hosted on a website of the movie studio or on a website of a survey partner, which may include a series of questions for screening potential users for participating in a virtual screening of the media content. The system 100 may identify users for participating in the virtual screening based on the responses provided by the users to the questions in the survey, based on having target demographic characteristics preferred by the movie studio, based on having any number of characteristics in common with the subject matter of the media content of the virtual screening, based on random selection, based on a user's desire to participate, based on a round-robin fashion, based on any desired condition and/or factor, or a combination thereof. In certain embodiments, the users may be sent digital or physical invitations to participate in the virtual screening and the system 100 may process responses to such invitations accordingly. For example, based on response to invitations, the system 100 may reserve each user's place in a particular virtual screening. In certain embodiments, the identifying of the user for participation in the virtual screening may be performed and/or facilitated by utilizing the first user 101, the second user 110 and/or by utilizing the first user device 102, the second user device 111, the server 140, the server 145, the server 150, the server 160, the communications network 135, any component of the system 100, any combination thereof, and/or by utilizing any other appropriate program, network, system, or device.

At step 404, the method 400 may include transmitting a unique link to each user for facilitating access to the media content. For example, the first user 101 may have been identified and selected for participating in the virtual screening of a particular movie. Once the first user 101 was identified and/or selected for participation for the virtual screening, the system 100 may generate the unique link and transmit the unique link to a device of the first user 101, such as the first user device 102. Each link may be specific and tailored to each user that is selected for participation for the virtual screening. In certain embodiments, the link may be configured to only be opened by a device known to be associated with a selected user. For example, the link may be configured such that only the first user device 102 may be utilized to open the link, which may be utilized to facilitate access to the movie associated with the virtual screening. In certain embodiments, the generation and/or transmission of the unique link to each user may be performed and/or facilitated by utilizing the first user 101, the second user 110 and/or by utilizing the first user device 102, the second user device 111, the server 140, the server 145, the server 150, the server 160, the communications network 135, any component of the system 100, any combination thereof, and/or by utilizing any other appropriate program, network, system, or device.

At step 406, the method 400 may include determining if the user has successfully authenticated with the system 100 after interacting with the unique link sent to the user. The user may interact with the link by clicking on the link (e.g. with a mouse), tapping on the link (e.g. via a touchscreen of first user device 102), issuing a verbal command to access the link, and/or performing any other action that facilitates interaction with the link. Once the link is interacted with, the system 100 may cause an authentication process to initiate for the user to authenticate into the system 100 providing the operative functionality of the method 400. In certain embodiments, the authentication process may involve the user inputting a username and/or password combination for registering with the system 100. In certain embodiments, the authentication process may include additional layers of security or alternative layers of security. For example, after the user interacts with the link and/or after the user enters in a username/password combination, the system 100 may transmit a unique code as a part of a multi-factor authentication process to the user's device (e.g. first user device 102). Once the code is received at the user's device, the user may enter the code into an application supporting the functionality of the system 100 to authenticate into the system 100. In certain embodiments, other forms of authentication may be utilized, alone or in combination with any other forms of authentication described herein and/or elsewhere. For example, the system 100 may facilitate authentication of the user by enabling the user to utilize time-based one-time passwords generated directly by the application supporting the functionality of the system 100 or by a separate application, such as an authenticator application, that generates unique codes at selected or random time intervals. When the user inputs the correct generated password into the application supporting the functionality of the system 100, the user and/or the user's device may be authenticated into the system 100. In certain embodiments, further forms of authentication may be utilized as well. For example, biometric authentication, such as, but not limited to, iris scans, fingerprint scans, heart rate scans, temperature measurements, user health profiles, body measurement information, and/or other biometric information may be utilized to authenticate the user into the system 100 as well. In certain embodiments, the determining as to whether the user the user has successfully authenticated into the system 100 may be performed and/or facilitated by utilizing the first user 101, the second user 110 and/or by utilizing the first user device 102, the second user device 111, the server 140, the server 145, the server 150, the server 160, the communications network 135, any component of the system 100, any combination thereof, and/or by utilizing any other appropriate program, network, system, or device.

If, at step 406, the method 400 includes determining that the user has not successfully authenticated with the system 100, the method 400 may proceed to step 408, which may include preventing the user from accessing the media content associated with the virtual screening. For example, the user may have entered in an incorrect code, incorrect password, incorrect biometric information, and/or any other incorrect information as required by the authentication process. Upon unsuccessful authentication, the user may be directed to a web page or application page that provides the user with another chance to enter in correct authentication information and/or may provide an indication to the user than authentication was unsuccessful. In certain embodiments, the system 100 may block the user from attempting to authenticate after a certain number of attempts. If, however, at step 406, the method 400 includes determining that the authentication was successful, the method 400 may proceed to step 410, which may include associating the unique link with an identifier associated with the user. For example, the link may be locked and/or associated with the internet protocol address of the user's device (e.g. first user device 102), a device identifier associated with the device (e.g. model number, unit number, manufacturing number), a media access control address associated with the user's device, any unique identifier associated with the user's device, any information associated with the user, or a combination thereof. In certain embodiments, the associating of the link with the identifier may serve to ensure that only the user and/or the user's device is utilized to access the media content associated with the virtual screening. For example, a device not having the identifier associated with the link may be prevented by the system 100 from accessing the media content when attempting to access the media content. In certain embodiments, the associating of the unique link with the identifier may be performed and/or facilitated by utilizing the first user 101, the second user 110 and/or by utilizing the first user device 102, the second user device 111, the server 140, the server 145, the server 150, the server 160, the communications network 135, any component of the system 100, any combination thereof, and/or by utilizing any other appropriate program, network, system, or device.

At step 412, the method may include requesting a digital key for facilitating decryption of the media content. For example, the digital key may be a digital rights management key that may be utilized to decrypt an encrypted version of the media content that the user wishes to access during the virtual screening. If an appropriate digital key is not utilized, the user and/or the user's device may be prevented from decrypting the encrypted version of the media content during a virtual screening. In certain embodiments, the requesting of the digital key may be performed and/or facilitated by utilizing the first user 101, the second user 110 and/or by utilizing the first user device 102, the second user device 111, the server 140, the server 145, the server 150, the server 160, the communications network 135, any component of the system 100, any combination thereof, and/or by utilizing any other appropriate program, network, system, or device.

At step 414, the method may include requesting a digitally signed file for facilitating access to the media content. For example, the request may be for a digitally signed cookie (or some other type of file) that the device of the user may digitally sign (or other device depending on the implementation). For example, the process may work as follows: when the user authenticates into the system 100 seeking to access the media content, the system 100 may return set cookie (or other file) headers in a response back to the user's device. In certain embodiments, the requesting of the digitally signed file may be performed and/or facilitated by utilizing the first user device 102, the second user device 111, the server 140, the server 145, the server 150, the server 160, the communications network 135, any component of the system 100, any combination thereof, and/or by utilizing any other appropriate program, network, system, or device. A viewer for viewing the media content on the user's device may store the name-value pairs. The user may then request the file associated with the media content from the system 100, and, with the user's request, the user's browser (or other application for accessing the media content supplied by the system 100) may obtain the previously obtained name-value pairs and add them to the request, such as in a header of a cookie (or other file) accompanying the request. The cookie (or other file) including the name-value pairs may be sent to the system 100 and may serve as the digitally signed file. The system 100 may analyze the digitally signed file received from the user's device and validate the digitally signed file (i.e. cookie) to confirm that the file has a valid signature (e.g. such as by using a public key or other technique for analyzing the validity of a signature).

If the digitally signed file is invalid, the system 100 may prevent the user from accessing the media content (e.g. by going back to step 408). If, however, the digitally signed file is determined to be valid, the system 100 may analyze rules, parameters, policies, and/or conditions associated with the cookie (or other type of file). For example, information contained within the cookie and/or in content associated with the cookie may indicate that the media content may only be accessed during a specific timeframe. If the request to access the media content comes to the system 100 outside the allowable timeframe, the system 100 may reject the request even if the signature is valid. As further examples, the cookie (or other file) may dictate the specific media content that the user may access, the format of the version of the media content that the user may access, which device may access the media content, how long the media content can be accessed, whether the media content may be downloaded, whether the media content may be copied, whether the media content may be edited, any action with respect to the media content and/or the system 100, or a combination thereof. On the other hand, if the request from the user and/or the user device meets the rules, parameters, policies, and/or conditions associated with the cookie (or other file), the method 400 may proceed to step 416. At step 416, the method 400 may include applying a watermark to the media content to be provided to the user to facilitate tracking of the use of the media content. In certain embodiments, the applying of the watermark may be performed and/or facilitated by utilizing the first user device 102, the second user device 111, the server 140, the server 145, the server 150, the server 160, the communications network 135, any component of the system 100, any combination thereof, and/or by utilizing any other appropriate program, network, system, or device.

In certain embodiments, the applying of the watermark to the media content may involve applying a visual watermark that is intermixed and/or embedded into the media content, an audio watermark (e.g. a unique sound—whether perceptible by a human ear or not), incorporating unique metadata into the media content, a digital marker embedded into the media content, incorporating information hidden within digital signals comprising portions of the media content, any other type of watermark, or a combination thereof. The watermark may include information specific to the user, such as, but not limited to, information identifying the user, information identifying a device of the user, a unique code generated for the user and/or a device of the user, unique media content embedded within the media content, a unique message incorporated with the media content, any other unique information, or a combination thereof. In certain embodiments, the watermark may be tracked by the system 100 to determine if the media content has been modified, transferred, copied, tampered with, used, accessed, stored, and/or otherwise manipulated, such as in an unauthorized manner. In certain embodiments, since the watermark may be unique for the particular user participating in a virtual screening, the system 100 can easily track unauthorized usage of the media content and may take appropriate action against the user. In certain embodiments, the watermark may be configured to be perceptible with the media content being screened or may be configured to be imperceptible such that a user cannot see, hear, or otherwise perceive it. In certain embodiments, the system 100 may support session-based forensic watermarking for viewing of media content as well. In certain embodiments, each virtual screening session may incorporate the use of different watermarks so that use of media content during one session may be tracked separately from use of media content from another session.

Once the watermark is applied to the media content utilized for the virtual screening, the method 400 may include, at step 418, streaming, during the virtual screening, the media content to the device of the user according to parameters, conditions, and/or rules associated with the digitally signed file and/or by utilizing the digital key to decrypt the encrypted media content. In certain embodiments, the streaming of the media content may be performed and/or facilitated by utilizing the first user device 102, the second user device 111, the server 140, the server 145, the server 150, the server 160, the communications network 135, any component of the system 100, any combination thereof, and/or by utilizing any other appropriate program, network, system, or device. The user may watch, listen, and/or otherwise experience the streamed media content, such as via the first user device 102 (or other suitable device), during the virtual screening of the media content. In certain embodiments, the media content may be streamed via an application accessible on the user's device that also supports some or all of the other functionality of the system 100. While the media content is being streamed to the user and/or after the media content is streamed to the user, the method 400 may include, at step 420, obtaining feedback associated with the media content from the user that participated in the virtual screening of the media content. In certain embodiments, the obtaining of the feedback may be performed and/or facilitated by utilizing the first user device 102, the second user device 111, the server 140, the server 145, the server 150, the server 160, the communications network 135, any component of the system 100, any combination thereof, and/or by utilizing any other appropriate program, network, system, or device. For example, the feedback may be obtained via a digital survey provided by the system 100 to the user via the device of the user, a video conference with the user, a phone conference with the user, an electronic message exchange with the user, any feedback technique, or a combination thereof. The feedback may indicate preferences for the media content, preferences for certain portions of the media content, distaste for certain portions of the media content, opinions relating to the media content, ratings of the media content, any feedback associated with the media content, or a combination thereof. In certain embodiments, the method 400 may include utilizing the feedback to alter the media content, enhance the media content, remove content from the media content, create additional media content, or a combination thereof. The method 400 may repeated as desired for any number of participants participating in any number of virtual screenings for any number and/or type of media content. Notably, the method 400 may further incorporate any of the features and functionality described for the system 100, any other method disclosed herein, and/or any other features and/or functionality described herein.

The systems and methods disclosed herein may include additional functionality and features. For example, the system and methods may provide for a streamlined virtual screening reservation system that fully integrates the reservation process with transcoding processes, authentication processes, encryption processes, decryption processes, watermark application processes, media content generation processes, media content streaming processes, and feedback processes all with the same system and/or application. The system and methods may provide a communal online screening with users from a variety of different screening recruitment sources (e.g. surveys, invitations, selections by the system based on demographics, etc.). The system and methods may provide a platform that also prevents piracy of media content and ensures that only authorized usage of media content is facilitated. In certain embodiments, the system and methods may drive the users to external sites and/or feedback systems after viewing or otherwise experience media content. In certain embodiments, the system and methods may include utilizing artificial intelligence and/or machine learning systems to utilize feedback to train artificial intelligence models of the system 100 over time so that the system 100 may anticipate potential reactions to media content from certain types of users. For example, over time, the system 100 may learn that certain users with certain demographic characteristics may enjoy a certain type of movie with certain types of action sequences in it. Similarly, the system 100 may learn that certain users with other demographic characteristics or life experiences may not enjoy the very same movie. The system 100 may analyze feedback and learn which geographic regions, users, and/or communities may prefer certain types of media content and may provide recommendations to creators and/or distributors of the content with curated information that indicates where to market media content, how to market media content, and to whom media content should be marketed to.

The systems and methods disclosed herein may include still further functionality and features. For example, the operative functions of the system 100 and method may be configured to execute on a special-purpose processor specifically configured to carry out the operations provided by the system 100 and method. Notably, the operative features and functionality provided by the system 100 and method may increase the efficiency of computing devices that are being utilized to facilitate the functionality provided by the system 100 and the various methods discloses herein. For example, by training the system 100 over time based on data and/or other information provided and/or generated in the system 100, a reduced amount of computer operations may need to be performed by the devices in the system 100 using the processors and memories of the system 100 than compared to traditional methodologies. In such a context, less processing power needs to be utilized because the processors and memories do not need to be dedicated for processing. As a result, there are substantial savings in the usage of computer resources by utilizing the software, techniques, and algorithms provided in the present disclosure. In certain embodiments, various operative functionality of the system 100 may be configured to execute on one or more graphics processors and/or application specific integrated processors.

Notably, in certain embodiments, various functions and features of the system 100 and methods may operate without any human intervention and may be conducted entirely by computing devices. In certain embodiments, for example, numerous computing devices may interact with devices of the system 100 to provide the functionality supported by the system 100. Additionally, in certain embodiments, the computing devices of the system 100 may operate continuously and without human intervention to reduce the possibility of errors being introduced into the system 100. In certain embodiments, the system 100 and methods may also provide effective computing resource management by utilizing the features and functions described in the present disclosure. For example, in certain embodiments, devices in the system 100 may transmit signals indicating that only a specific quantity of computer processor resources (e.g. processor clock cycles, processor speed, etc.) may be devoted to streaming media content to participants admitted to a virtual screening, obtaining and/or soliciting feedback from users, applying watermarks to media content, storing and/or caching the media content, authenticating users in to the system 100 in order to access content and/or functionality of the system 100, and/or performing any other operation conducted by the system 100, or any combination thereof. For example, the signal may indicate a number of processor cycles of a processor that may be utilized to generate unique links for users to access the media content from, and/or specify a selected amount of processing power that may be dedicated to generating or any of the operations performed by the system 100. In certain embodiments, a signal indicating the specific amount of computer processor resources or computer memory resources to be utilized for performing an operation of the system 100 may be transmitted from the first and/or second user devices 102, 111 to the various components of the system 100.

In certain embodiments, any device in the system 100 may transmit a signal to a memory device to cause the memory device to only dedicate a selected amount of memory resources to the various operations of the system 100. In certain embodiments, the system 100 and methods may also include transmitting signals to processors and memories to only perform the operative functions of the system 100 and methods at time periods when usage of processing resources and/or memory resources in the system 100 is at a selected value. In certain embodiments, the system 100 and methods may include transmitting signals to the memory devices utilized in the system 100, which indicate which specific sections of the memory should be utilized to store any of the data utilized or generated by the system 100. Notably, the signals transmitted to the processors and memories may be utilized to optimize the usage of computing resources while executing the operations conducted by the system 100. As a result, such functionality provides substantial operational efficiencies and improvements over existing technologies.

Figure 5:
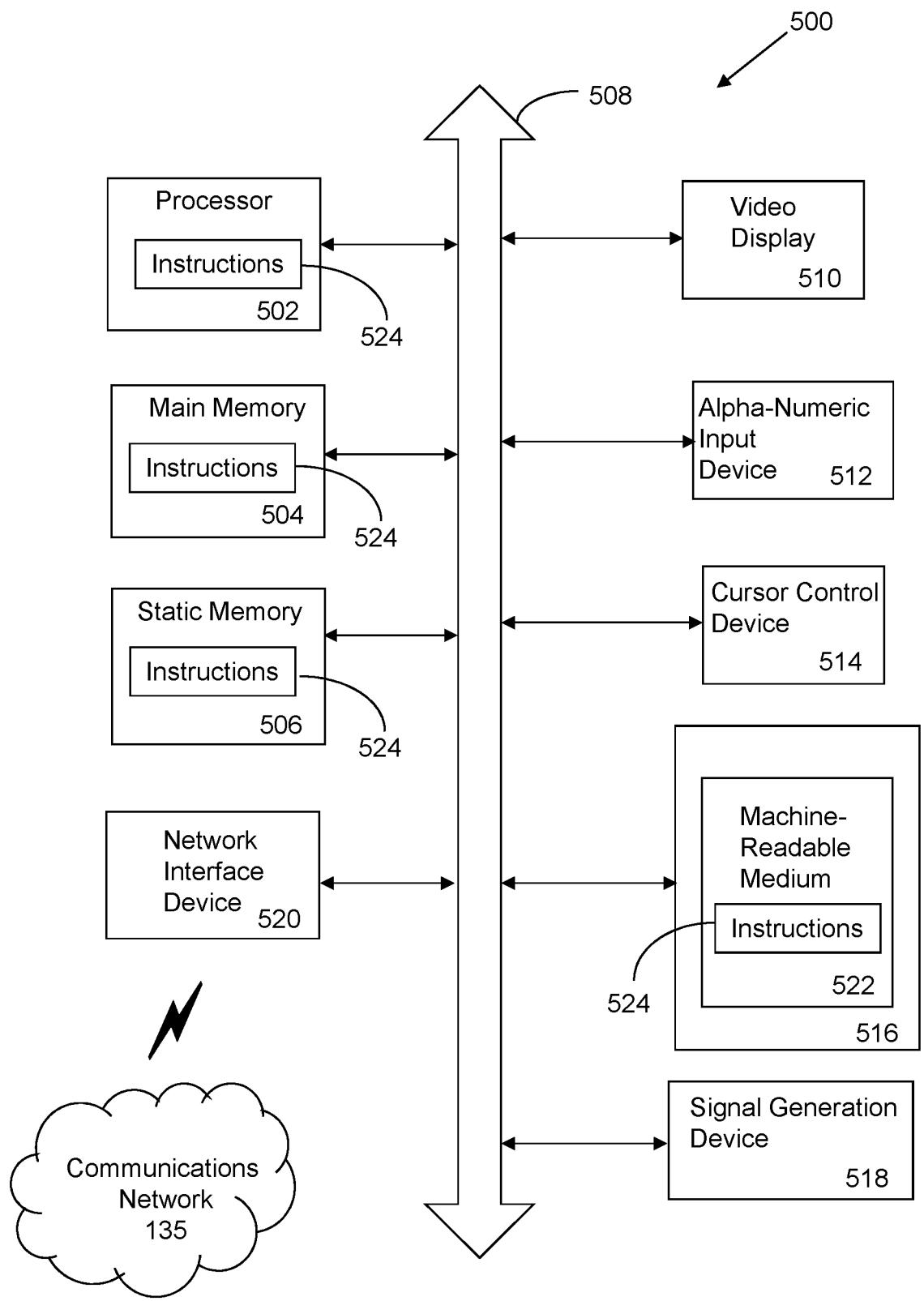
FIG. 5 is a schematic diagram of a machine in the form of a computer system within which a set of instructions, when executed, may cause the machine to facilitate a virtual screening according to embodiments of the present disclosure.

Referring now also to FIG. 5, at least a portion of the methodologies and techniques described with respect to the exemplary embodiments of the system 100 can incorporate a machine, such as, but not limited to, computer system 500, or other computing device within which a set of instructions, when executed, may cause the machine to perform any one or more of the methodologies or functions discussed above. The machine may be configured to facilitate various operations conducted by the system 100. For example, the machine may be configured to, but is not limited to, assist the system 100 by providing processing power to assist with processing loads experienced in the system 100, by providing storage capacity for storing instructions or data traversing the system 100, or by assisting with any other operations conducted by or within the system 100. As another example, the computer system 500 may assist with identifying users for participating in virtual screenings, generating and transmitting unique links to users for accessing media content associated with virtual screening, authenticating users and/or devices to access the media content, locking an identifier(s) associated with the user and/or a device of the user with the link, requesting digital keys for decrypting and/or encrypting media content, requesting digital signed files (e.g. cookies, etc.) for facilitating access to media content based on various parameters, applying visual or other watermarks to the media content, streaming the media content to devices of users, obtaining feedback from users through a variety of feedback gathering techniques, and/or performing any of the operations and functionality described in the present disclosure. As another example, the computer system 500 may assist with ensuring that media content consumed by a user is only used during a specified timeframe on a specified device by the user only.

In some embodiments, the machine may operate as a standalone device. In some embodiments, the machine may be connected (e.g., using communications network 135, another network, or a combination thereof) to and assist with operations performed by other machines and systems, such as, but not limited to, the first user device 102, the second user device 111, the server 140, the server 145, the server 150, the database 155, the server 160, any other system, program, and/or device, or any combination thereof. The machine may be connected with any component in the system 100. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510, which may be, but is not limited to, a liquid crystal display (LCD), a flat panel, a solid-state display, or a cathode ray tube (CRT). The computer system 500 may include an input device 512, such as, but not limited to, a keyboard, a cursor control device 514, such as, but not limited to, a mouse, a disk drive unit 516, a signal generation device 518, such as, but not limited to, a speaker or remote control, and a network interface device 520.

The disk drive unit 516 may include a machine-readable medium 522 on which is stored one or more sets of instructions 524, such as, but not limited to, software embodying any one or more of the methodologies or functions described herein, including those methods illustrated above. The instructions 524 may also reside, completely or at least partially, within the main memory 504, the static memory 506, or within the processor 502, or a combination thereof, during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 522 containing instructions 524 so that a device connected to the communications network 135, another network, or a combination thereof, can send or receive voice, video or data, and communicate over the communications network 135, another network, or a combination thereof, using the instructions. The instructions 524 may further be transmitted or received over the communications network 135, another network, or a combination thereof, via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

We claim:

1. A system, comprising:
a memory that stores instructions; and
a processor that executes the instructions to perform operations, the operations comprising:
identifying a user for participating in a virtual screening of media content;
transmitting a unique link to the user for facilitating access to the media content at a specified time, the unique link being unique to the user;
authenticating, after the user interacts with the unique link, the user for the virtual screening via a multi-factor authentication process;
associating, after the authenticating, the unique link with an identifier associated with the user;
requesting a digital key for facilitating decryption of the media content;

requesting, from a device of the user, a digitally signed file for facilitating access to the media content for the device of the user at the specified time and for a specified duration of time, the digitally signed file including one or more previously provided name-value pairs;

applying a visual watermark to the media content for facilitating tracking of use of the media content;

streaming, during the virtual screening, the media content to the device of the user according to a parameter of the digitally signed file and by utilizing the digital key; and obtaining feedback associated with the media content from the user.

2. The system of claim 1, wherein the operations further comprise encoding a source file associated with the media content into a media content file having a format suitable for streaming the media content.

3. The system of claim 2, wherein the operations further comprise encrypting the media content file having the format suitable for streaming the media content after performing the encoding.

4. The system of claim 3, wherein the operations further comprise generating A/B variants of the media content file for facilitating testing of different versions of the media content.

5. The system of claim 4, wherein the operations further comprise storing the media content file, the A/B variants of the media content file, or a combination thereof, in a content distribution system.

6. The system of claim 1, wherein the operations further comprise transmitting the unique link to the user by transmitting the unique link to the device of the user, transmitting the unique link via an electronic mail message, transmitting the unique link via an instant message, transmitting the unique link via a notification, transmitting the unique link via an alert, transmitting the unique link via media content, or a combination thereof.

7. The system of claim 1, wherein associating the unique link with the identifier associated with the user comprises locking the unique link to an internet protocol address associated with the user, the device of the user, or a combination thereof.

8. The system of claim 1, wherein the operations further comprise tracking misuse of the media content, copying of the media content, transmission of the media content, unauthorized access of the media content, or a combination thereof, based on monitoring the visual watermark applied to the media content.

9. The system of claim 1, wherein the operations further comprise authenticating the user via the multifactor authentication process by transmitting a code to the device of the user and receiving an input of the code by the user via an application associated with streaming the media content to the user.

10. The system of claim 1, wherein the operations further comprise authenticating the user via the multifactor authentication process by receiving a time-based one-time password generated by an authenticator application executing on the device of the user.

11. The system of claim 1, wherein the operations further comprise injecting digital rights management into the media content.

12. The system of claim 1, wherein the operations further comprise providing mixed media content segments with encoded user data associated with the user with the media content being streamed to the device of the user.

13. The system of claim 1, wherein the operations further comprise obtaining the feedback associated with the media content from the user via a digital survey, via a video conference, via an audio conference, via a call, via an email message, via an instant message, via a communication, or a combination thereof.

14. A method, comprising:
identifying a user for participating in a virtual screening of media content;

transmitting a unique link to the user for facilitating access to the media content at a specified time, the unique link being unique to the user;

authenticating, after the user interacts with the unique link, the user for the virtual screening via a multifactor authentication process;

associating, after the authenticating, the unique link with an identifier associated with the user;

requesting a digital key for facilitating decryption of the media content;

requesting, from a device of the user, a digitally signed file for facilitating access to the media content for the device of the user at the specified time and for a specified duration of time, the digitally signed file including one or more previously provided name-value pairs;

applying, by utilizing instructions from a memory that are executed by a processor, a visual watermark to the media content for facilitating tracking of use of the media content;

streaming, during the virtual screening, the media content to the device of the user according to a parameter of the digitally signed file and by utilizing the digital key; and obtaining feedback associated with the media content from the user.

15. The method of claim 14, further comprising identifying the user for participating in the virtual screening based on demographic information associated with the user, based on a survey response provided by the user, based on media content preference information associated with the user, based on the user having a characteristic associated with a desired consumer of the media content, or a combination thereof.

16. The method of claim 14, further comprising obtaining the feedback associated with the media content during streaming of the media content to the device of the user, after streaming of the media content to the device of the user, or a combination thereof.

17. The method of claim 14, further comprising streaming a different version of the media content to a different user.

18. The method of claim 14, further comprising preventing another device from accessing the media content based on at least the association of the unique link with the identifier associated with the user.

19. The method of claim 14, further comprising modifying the media content based on the feedback associated with the media content.

20. A computer-readable device comprising instructions, which, when loaded and executed by a processor, cause the processor to perform operations, the operations comprising:
identifying a user for participating in a virtual screening of media content;

transmitting a unique link to the user for facilitating access to the media content at a specified time, the unique link being unique to the user;

authenticating, after the user interacts with the unique link, the user for the virtual screening via a multifactor authentication process;

associating, after the authenticating, the unique link with an identifier associated with the user;
requesting a digital key for facilitating decryption of the media content;
requesting, from a device of the user, a digitally signed file for facilitating access to the media content for the device of the user at the specified time and for a specified duration of time, the digitally signed file including one or more previously provided name-value pairs;
applying a visual watermark to the media content for facilitating tracking of use of the media content;
streaming, during the virtual screening, the media content to the device of the user according to a parameter of the digitally signed file and by utilizing the digital key; and
obtaining feedback associated with the media content from the user.

* * * * *